United States Patent [19]
Yee et al.

[11] Patent Number: 5,872,976
[45] Date of Patent: Feb. 16, 1999

[54] CLIENT-BASED SYSTEM FOR MONITORING THE PERFORMANCE OF APPLICATION PROGRAMS

[75] Inventors: Andre H. Yee, Herndon; Christopher M. Flynn, Centreville; Russell W. Harkins, Arlington, all of Va.

[73] Assignee: Landmark Systems Corporation, Vienna, Va.

[21] Appl. No.: 831,350

[22] Filed: Apr. 1, 1997

[51] Int. Cl.[6] ........................................... G06F 11/30
[52] U.S. Cl. .................... 395/704; 395/680; 395/184.01; 364/550
[58] Field of Search ................... 395/704, 680, 395/184.01; 364/550

[56] References Cited

U.S. PATENT DOCUMENTS

| | | | |
|---|---|---|---|
| 5,047,919 | 9/1991 | Sterling et al. | 364/200 |
| 5,483,468 | 1/1996 | Chen et al. | 364/551.01 |
| 5,485,574 | 1/1996 | Bolosky et al. | 395/183.11 |
| 5,581,482 | 12/1996 | Wiedenman et al. | 364/551.01 |
| 5,687,376 | 11/1997 | Celi, Jr. et al. | 395/704 |
| 5,774,724 | 6/1998 | Heisch | 395/704 |

FOREIGN PATENT DOCUMENTS

| | | |
|---|---|---|
| 0652518 A1 | 5/1995 | European Pat. Off. |
| WO95/16959 | 6/1995 | WIPO |
| WO96/36918 | 11/1996 | WIPO |

OTHER PUBLICATIONS

Kishi, Nobuko, "*SimUI: Graphical User Interface Evaluation Using Playback*", The Sixteenth Annual International Computer Software & Applications Conference, Sep. 21–25, 1992, Chicago, Illinois, pp. 121–127.

*Primary Examiner*—Krisna Lim
*Assistant Examiner*—Saleh Najjar
*Attorney, Agent, or Firm*—Burns, Doane, Swecker & Mathis, L.L.P.

[57] ABSTRACT

A client-based application monitoring system detects events of interest by examining communications between an application program and the computer's operating system. A configuration module permits a user to identify specific events that occur during the operation of the application program, by presenting a sequence of messages that are passed between the application program and the operating system. The messages are described by means of a macro language which employs readily comprehensible terms that avoid the need for a detailed understanding of the application program itself. The user selects specific events of interest to be recorded for monitoring purposes. Thereafter, as the application program executes, the events of interest are recorded, and latencies between recorded events are calculated for generation of a report pertaining to application response times.

10 Claims, 5 Drawing Sheets

CLIENT-BASED SYSTEM FOR MONITORING THE PERFORMANCE OF APPLICATION PROGRAMS

FIELD OF THE INVENTION

The present invention is directed to computer systems, and more particularly to the monitoring of the performance of one or more application programs being executed on a computer system.

BACKGROUND OF THE INVENTION

As computer systems continue to grow in size, and the capabilities available to end users via such systems continue to expand, there is an ever-increasing demand upon available resources. This is particularly true in the case of computer networks, where a common resource may be shared by a number of client computers. In such a situation, bottlenecks can occur during the execution of application programs that are being run by users on individual clients of the network. The ability to recognize and prevent such bottlenecks from occurring during the execution of application programs has a direct impact on the productivity of the users of the computer system. To this end, therefore, it is desirable to monitor the response time of an application program during execution, to identify potential bottlenecks. By doing so, available resources can be reallocated as necessary to ensure optimum performance.

In general, one indication of application performance is obtained by measuring the amount of time that is required to respond to a particular request made by or to an application program. To do so, it is therefore necessary to record the times at which the request is generated, and the response is returned. By measuring the latency between the recorded times, a metric is obtained that provides a good indicator of the application's performance. Depending upon the amount of information that is desired, different amounts of monitoring criteria can be established. For example, if a measure of gross latency is sufficient to monitor performance, it may only be necessary to record the time at which the request is initially generated and the time at which the ultimate response is returned. Alternatively, if more information is desired, a time can be recorded for each individual task that is carried out in responding to the request, such as opening windows, performing calculations, etc.

In the past, the recording of the time at which various events occur during the execution of an application program was accomplished by incorporating application programming interfaces (APIs) into the program whose performance was to be monitored. In essence, these programming interfaces provide a form of instrumentation that permit individual events in the execution of an application to be identified, so that the time of their occurrence can be recorded. One particular advantage of this approach is the fact that any amount of desired detail, at any given level of operation of the program, can be obtained.

However, there are various limitations associated with this "instrumented" approach. One of these is the fact that it is highly labor intensive, since it requires the program to be rewritten to incorporate the APIs. To do so, of course, requires access to the source code for the program. As a result, off-the-shelf programs that are typically sold in "shrink-wrapped" form cannot be adapted by the user to monitor their performance.

Recently, a standard set of APIs has been proposed to provide greater uniformity in performance monitoring. See "Application Response Measurement API Guide", May 1996. While these standard APIs can be readily incorporated into newly developed programs, they cannot be used with pre-existing programs unless the programs are rewritten to incorporate them. Again, therefore, significant effort must be expended to be able to monitor such programs.

A different, but related, approach is disclosed in U.S. Pat. No. 5,485,574. In the system of this patent, a facility is provided in the kernel of the computer's operating system to count instructions or calls to sections of program code. While this approach avoids the need to incorporate APIs into individual application programs, it still requires that a program, in this case the kernel of the computer's operating system, be modified to provide the necessary instrumentation. In addition, results are obtained at the kernel level of the operating system, rather than at the application or user level.

As an alternative to the instrumented approach that requires customization of an individual program, another technique for monitoring the performance of a system relies upon network-based communications. Typically, communications between an application program running on a client station and a network server are transmitted via individual data packets. All of the packets pertaining to a given application program are transmitted through a logical port associated with the server. In the network-based approach to monitoring, all packets which pass through a given port are opened, and examined, to determine the types of actions to which they pertain. If a packet contains data relating to a task of interest, the time at which that packet passes through the port is recorded. The advantage of this approach is that it does not require any modification of the application program, and theoretically is applicable to all available programs. However, the results provided by this approach are not completely accurate. In particular, the examination of the data packets takes place along the communication path between the client station and the network server. As such, the times which are recorded in association with each packet only reflect the instance at which the packet passes through the designated port. They do not include additional processing time that may be encountered by the packet after it passes through the port but before the final result is delivered to the requesting application. As another consideration, the examination of the packets is typically carried out by a machine that is separate from the client station, and hence this approach presents increased hardware expenses. Furthermore, in order to examine the individual packets, the network interface card must operate in a promiscuous mode to permit the port traffic to be examined. Since this mode of operation permits external entities to access the packets, security is compromised.

It is desirable, therefore, to provide a non-instrumented monitor which does not need to be incorporated into specific programs, and thereby permits the performance of any program to be monitored without modification thereof. Further in this regard, it is desirable to provide such a system which is client-based, so that it provides a true measure of the response time associated with a given task.

SUMMARY OF THE INVENTION

In accordance with the present invention, a system for monitoring the response times of application programs detects events of interest by examining communications between an application program and the computer's operating system. A configuration module permits a user to identify specific events that occur during the operation of application programs, by presenting a sequence of messages that are passed between the application programs and the operating system. Preferably, the messages are described by means of a high-level language which employs readily comprehensible terms that avoid the need for a detailed understanding of the application program itself. The user can then select specific events of interest to be recorded for monitoring purposes. Thereafter, as the application programs execute, the events of interest are recorded. The latency between recorded events represents the response times of the application programs. These response times can be stored in a file for the generation of a report pertaining to application performance.

Further features of the invention, and the advantages offered thereby, are described hereinafter with reference to an embodiment of the invention illustrated in the accompanying drawings.

DETAILED DESCRIPTION

To facilitate an understanding of the present invention, it is described hereinafter with reference to a particular embodiment that is implemented in the context of a computer network that is designed to operate with client applications that run on the Windows® operating system. It will be appreciated, however, that the practical applications of the invention are not limited to this particular implementation. Rather, the principles which underline the invention are applicable to stand-alone computers as well as computer networks, and can be used with a variety of different operating systems.

Figure 1:
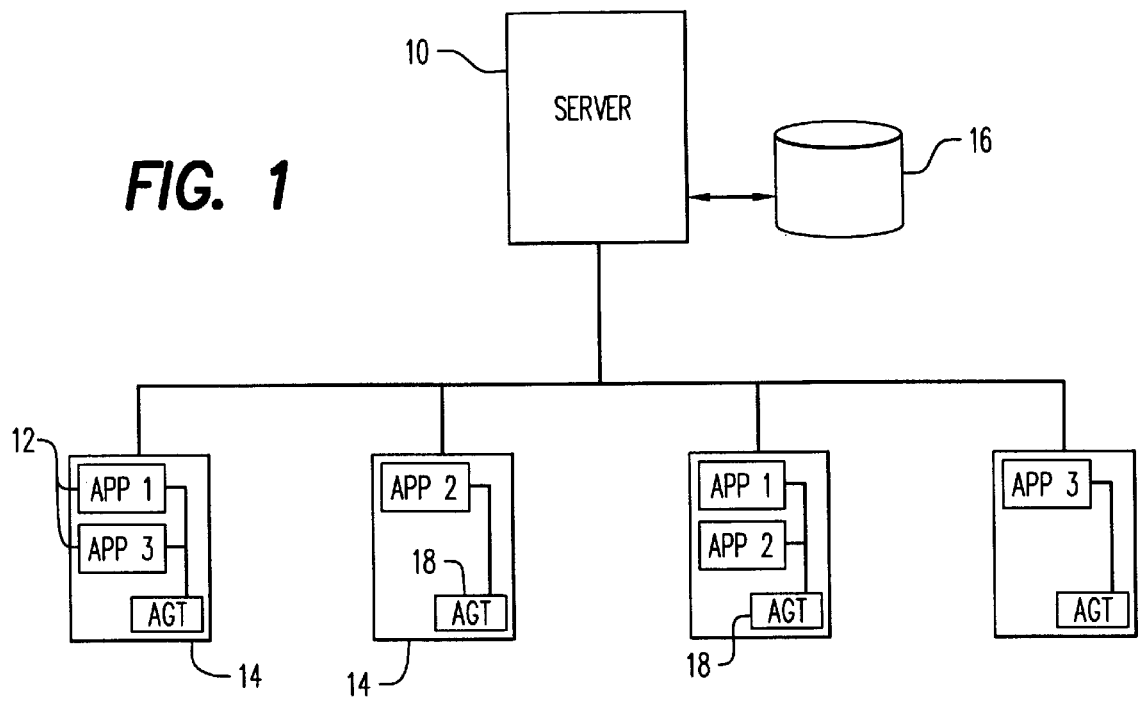
FIG. 1 is a block diagram of a networked computer system in which the present invention can be implemented.

A typical network of a type in which the present invention might be employed is illustrated in block diagram form in FIG. 1. The network includes a central server 10 that services requests promulgated by various client application programs 12 running on individual nodes 14 of the network. For example, the server may include a database 16 which can be accessed by one or more of the client applications. A typical request from the client applications may be to retrieve certain data from the database, and return it to the requesting application, so that it can be displayed to the user at a given node in a desirable format.

Figure 2:
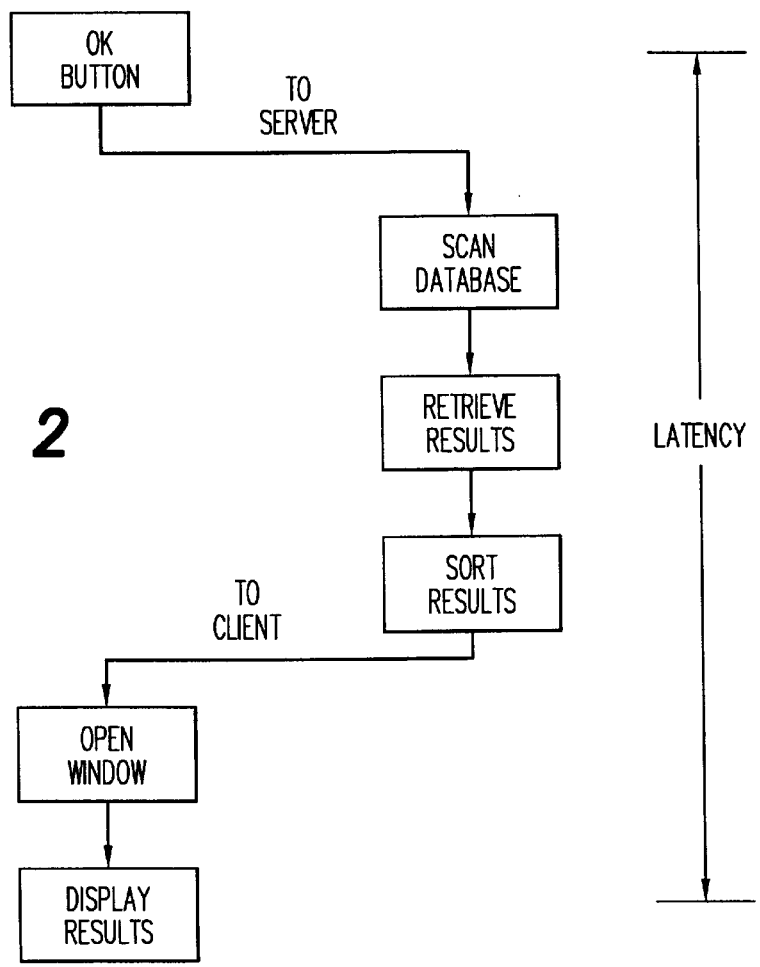
FIG. 2 is a flow chart of the steps that are carried out in the servicing of a request.

As an example, a user at one of the network nodes may issue a command to retrieve all records from the database which match a given search criterion, and sort the retrieved records in date order. The steps that are involved in the servicing of this request are illustrated in FIG. 2. Referring thereto, the request is initiated when the user generates the instruction to perform the scan, for example by clicking upon an "OK" button in a window, or the like. The command associated with the clicking of this button, including the search parameters established by the user, are transmitted from the user's node to the network server. At the server, the database is scanned, and the records matching the search criteria are retrieved. Thereafter, the appropriate calculations are performed on the retrieved records, to sort them in the requested order. Once the sorting has been completed, the results are returned to the client application at the requesting node. At the node, a suitable window is opened and the results are displayed in the window. The total time between the initial generation of the request and the ultimate display of the results that are responsive to that request is a measure of the latency associated with the servicing of the request. By measuring the length of such latencies, it is possible to obtain a metric of the application response time.

In accordance with the present invention, this latency is measured by detecting preselected events that are associated with actions of interest. Typically, operating systems rely upon the interchange of information between the client application and the operating system itself. For example, when the user moves a cursor to a specific position on a display screen and clicks a mouse button, the operating system must inform the client application of the location of the cursor and the fact that the mouse button was clicked at this location. Depending upon the command associated with the clicking of the button, the client application may, in turn, inform the operating system of an action to be carried out, e.g., transmit a request to the network server. The present invention monitors application response times by observing these types of communications between an application program and the computer's operating system.

Figure 3:
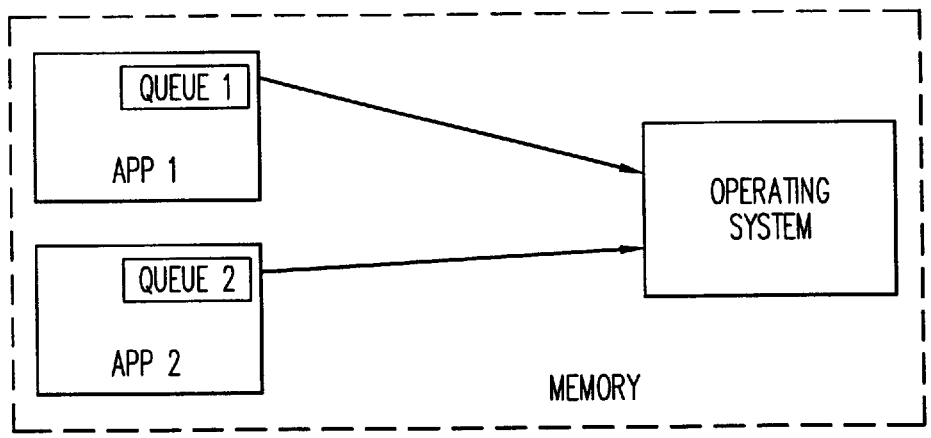
FIG. 3 is a schematic block diagram depicting the exchange of messages between an operating system and client applications.

In the Windows operating system, for example, the exchange of information between the operating system and a client application is carried out by means of "messages." Referring to FIG. 3, when an application program is running on a computer, the computer's operating system creates a message queue in the memory space which is allocated to that program. In the example of FIG. 3, there are two application programs currently being executed, and hence two message queues have been created in their respective memory spaces. Whenever there is information to be passed to an application program, for instance keystrokes entered by a user or a mouse button click, the operating system places this information in the message queue for that application. The application program periodically sends a command to the operating system to get its messages. In response, the operating system passes the contents of the message queue to the application. Conversely, whenever the application program has information to pass to the operating system, e.g., data to be transmitted to the network server 10, the application program may send a command to the operating system via a message. In response, the operating system reads the message, determines the action to be taken, and proceeds accordingly.

In accordance with the present invention, the application response time is monitored by examining the contents of the communications between the operating system and an application program, to detect certain events of interest. The latency between the selected events is recorded as the measure of response times.

Figure 4:
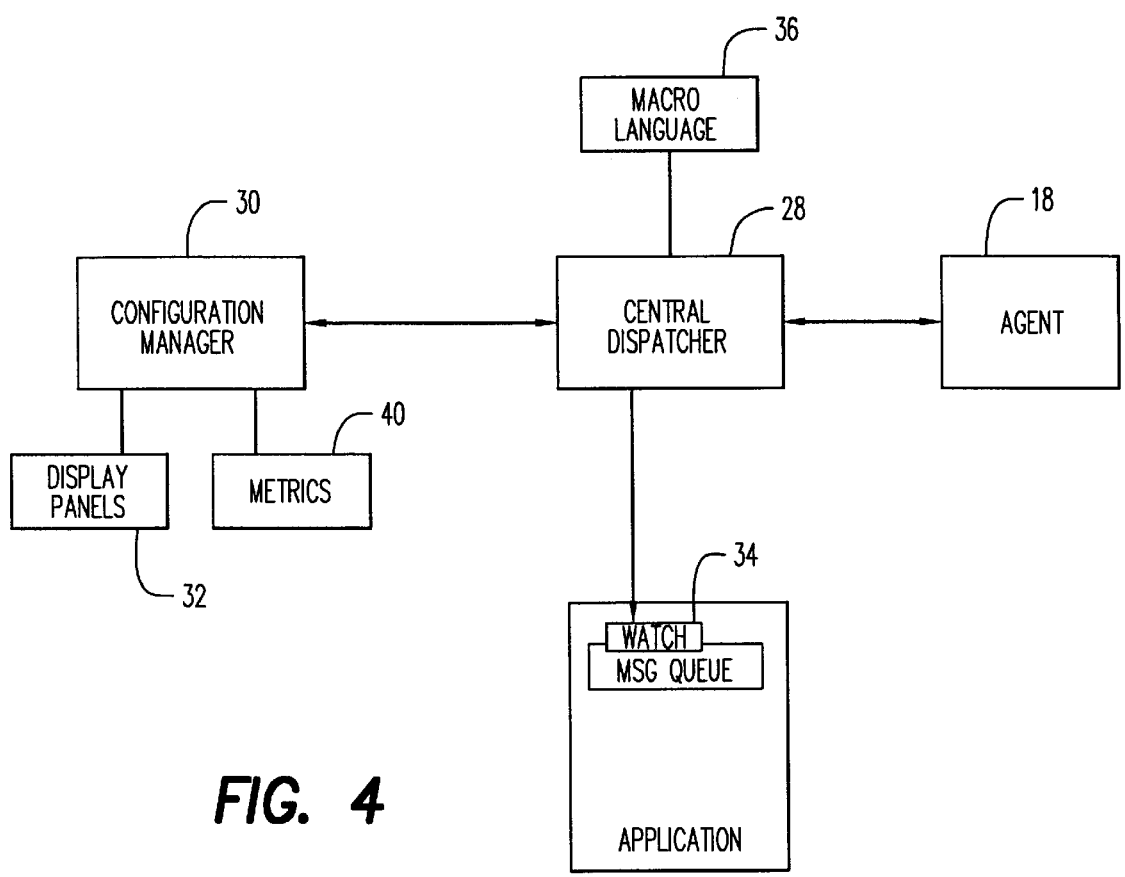
FIG. 4 is a block diagram of the architecture of an application monitoring system.

The observance of communications to monitor response times is carried out by a program known as an applications agent. Referring again to FIG. 1, an applications agent 18 might reside on each node 14 of the network having a client application 12 whose response times are to be monitored. The applications agent is external to the application program itself that is to be monitored, and runs in the background in a manner that is transparent to the user. The architecture of the overall application monitoring system is illustrated in FIG. 4. The main components of the monitoring system are the application agent 18, a central dispatcher 28 and a configuration manager 30. The configuration manager 30 enables the user to define the events that are to be monitored during the execution of an application program. For this purpose, the configuration manager includes various display panels 32, by which the user establishes the parameters for the monitoring of an application. The operation of the configuration manager will be described with reference to a functional block diagram shown in FIG. 5 and exemplary display panels illustrated in FIGS. 6–8.

In general, the configuration manager operates by monitoring an application program while it performs a task of interest, recording events that occur in connection with the task, and enabling the user to identify selected events as the measuring criteria for application response times. To define a transaction to be monitored, the user first launches the application, or applications, to be monitored, if they are not already running on the computer. The user then issues appropriate commands, for example through one or more interface windows (not shown) to indicate that a transaction is to be defined.

Figure 6:
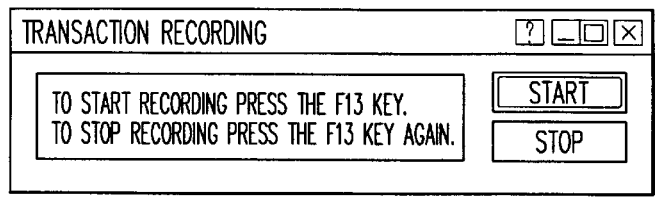
FIGS. 6, 7, and 8 illustrate display panels that are presented to the user during the definition of a transaction to be monitored.

In response to such a command, a Transaction Recording dialog box can be displayed, for example of the type illustrated in FIG. 6. This dialog box provides the user with two accessible controls for recording messages relating to a transaction, namely "start" and "stop". As an alternative to a dialog box, it is also possible to employ commands from a drop-down menu, or predefined keystrokes. When the applications running on the computer reach a point at which the user desires to define a task to be monitored, the user starts transaction recording, by clicking upon the "Start" button in the dialog box, or pressing an appropriate key on the computer's keyboard. This action activates a message recording function within the configuration manager 30. Thereafter, the user can perform any tasks that are necessary to the operation to be monitored. For example, if the user is interested in the latency associated with the servicing of a request to retrieve data from a database, the user generates the necessary commands to cause an application to carry out this function. Once the transaction has been performed, the "Stop" button, or an appropriate keyboard key, is pressed to terminate the recording function.

Figure 5:
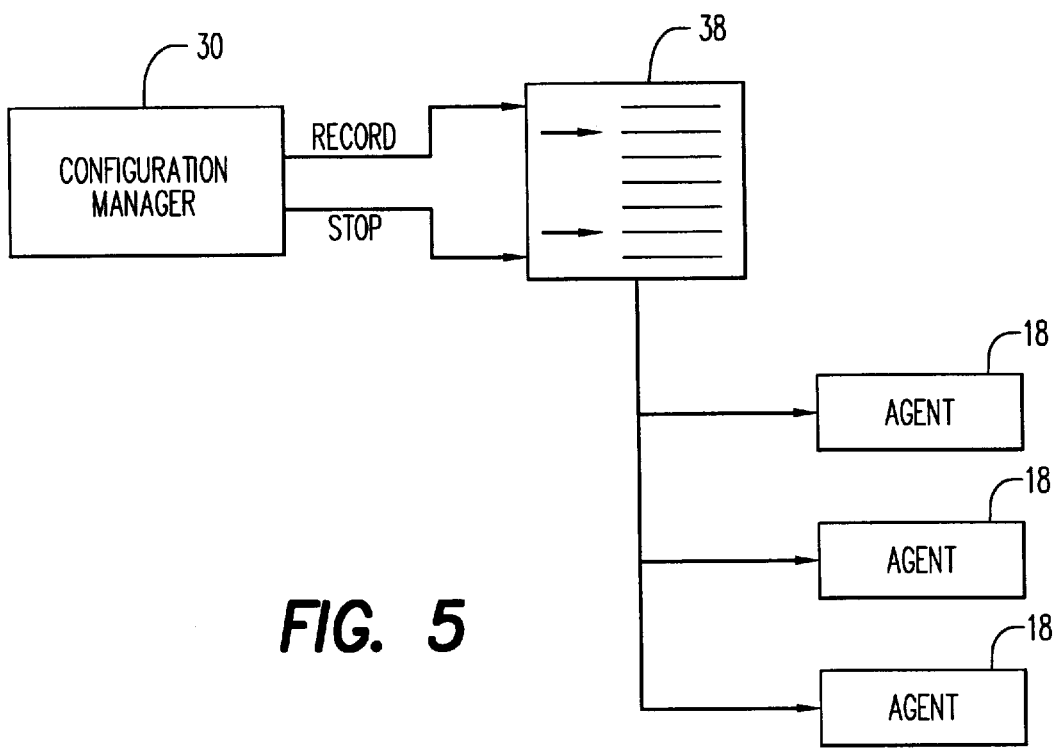
FIG. 5 is a functional block diagram of the operation of the configuration manager module.
Figure 7:
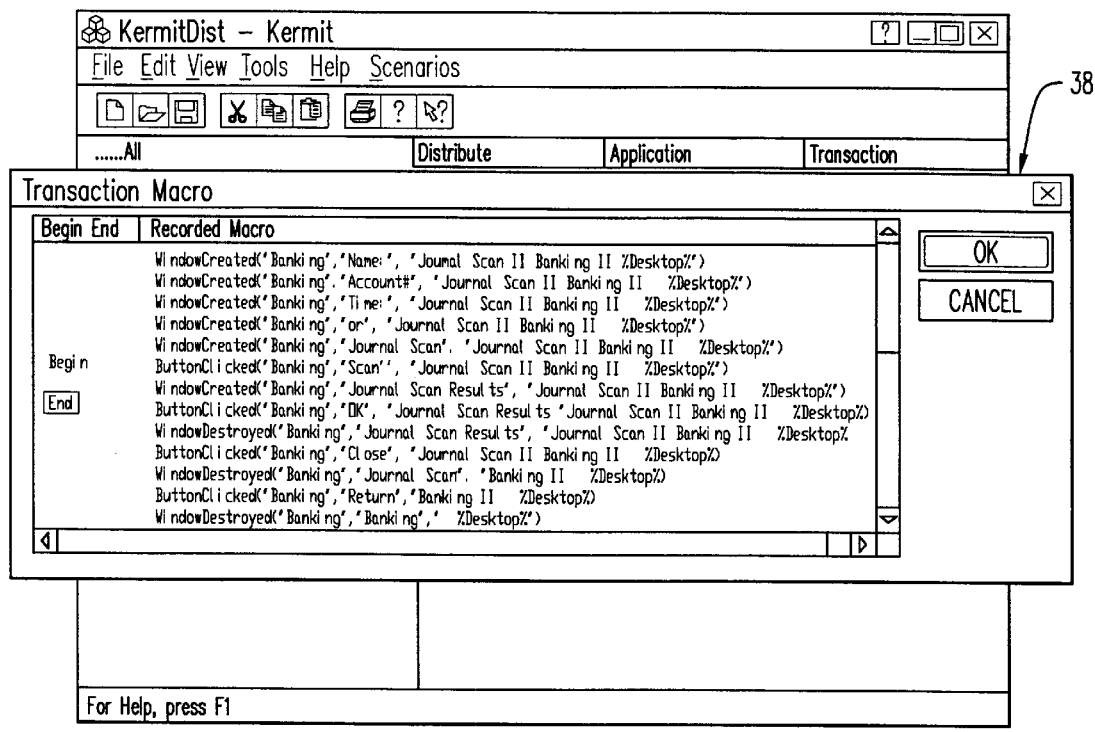

Referring again to FIG. 4, as the transaction is being recorded, all of the messages that are exchanged between the computer's operating system and currently running application programs are detected and stored by the central dispatcher 28. Once the recording of the transaction has been terminated, all of the stored messages are provided to the configuration manager. In response, the configuration manager displays a Transaction Macro dialog box 38, as schematically illustrated in FIG. 5. A more detailed example of such a dialog box is shown in FIG. 7. This dialog box presents to the user a sequential display of each message that was generated during the recorded portion of the transaction. For ease of understanding, the particular example shown in FIG. 7 illustrates messages that are exchanged between the operating system and a single application program. In practice, however, multiple applications may be running on the computer concurrently. In such a case, the dialog window 38 lists all of the various messages that are exchanged between the operating system and the executing programs during the transaction recording period.

From the listing in the dialog box, the user can select specific messages that identify the beginning and end of the transaction that is to be monitored. This is accomplished in the illustrated Transaction Macro dialog box by clicking a mouse button while the cursor is positioned in a column labelled "Begin/End", adjacent the messages of interest. In the specific example of FIG. 7, the user has selected the clicking of a "Scan" button as the beginning of a marked transaction, and the subsequent clicking of an "OK" button to end the transaction. Of course, other techniques for identifying the beginning and ending statements for a transaction can be employed as well.

In the example of FIG. 7, a single event is displayed for the action which initiates the scanning of the database to retrieve certain results. Once the results are returned to the client application, a window is created and the results are displayed within the window. Subsequently, the user clicks an "OK" button to remove the display of those results. Although only three events are depicted in the dialog box of FIG. 7 for this activity, in practice numerous messages might be exchanged between the operating system and the application program to perform the required task. Furthermore, the actual terms employed in those messages may not be readily understandable to the average user. To this end, therefore, the central dispatcher 28 preferably employs a high-level language, such as a macro language 36, to translate the specific content of the messages exchanged between the operating system and the application programs into terms that can be readily understood by the average user. FIG. 7 illustrates examples of such terms, which can be used to identify when a window is created or destroyed, and when a user clicks on a button within a window. Each term has associated parameters that identify the function associated with that term. For example, the "WindowCreated" term is followed by three parameters which identify the name of the application with which the window is associated, the title of the window, and the chain of parent windows within which the window being created is contained. To actually create a window, or to exchange information relating to the clicking of a button, several messages may pass between the application program and the operating system. Preferably, the macro language 36 encapsulates several of these messages, and/or events, into a single term that is displayed in the transaction macro dialog window of FIG. 7.

As alternatives, it is possible to employ other types of high-level languages to perform this function. For example, a script language, a programming language, or a code generator could be employed to translate low-level messages exchanged between the applications programs and the operating system into higher level terms that are more readily understandable to the user.

Once the user has selected the beginning and ending message statements that mark a transaction to be recorded, that particular transaction can be given a unique name, for subsequent use. At this point, the definition of the transaction to be monitored is complete. Once the transaction has been defined, it can be distributed to agents 18 on the nodes in the computer system where the transaction is to be monitored, as depicted in FIG. 5. To this end, the configuration manager 30 preferably provides the user with a view of all agents running on the network, so that the defined transaction can be distributed to selected agents.

The primary function of a defined transaction is to measure the time that elapses between the beginning and ending events identified by the user. Referring again to FIG. 4, when a transaction is to be monitored, the beginning and ending messages are supplied from the agent 18 to the central dispatcher 28. The dispatcher initiates a message watch function 34 which monitors each message that appears in the message queue for an application of interest. In the Windows operating system, for example, the contents of a message queue can be observed without affecting the message by means of a suitable message hook, which examines each message before it is passed to the application. Whenever a designated beginning or ending message appears in the queue, the central dispatcher informs the agent 18, which records the time at which the message appeared. For each recorded pair of start and stop times, the agent 18 computes the latency between the detected events, or messages. The calculated latencies are then stored in a file, for the subsequent generation of a report.

In the preceding example, only one pair of beginning and ending messages was identified to monitor response times. To obtain a greater amount of detail about the operation of a program, it may be desirable to establish nested sets of start and stop times. For example, within the latency associated with the performance of a general task, the user may wish to also measure the latencies of more specific tasks that are carried out in the implementation of the general task. In a preferred embodiment of the invention, therefore, the user can designate multiple start and stop times for a given transaction to be monitored. During the transaction, the latencies associated with each pair of associated start and stop times are calculated and stored, for subsequent reporting purposes.

Figure 8:
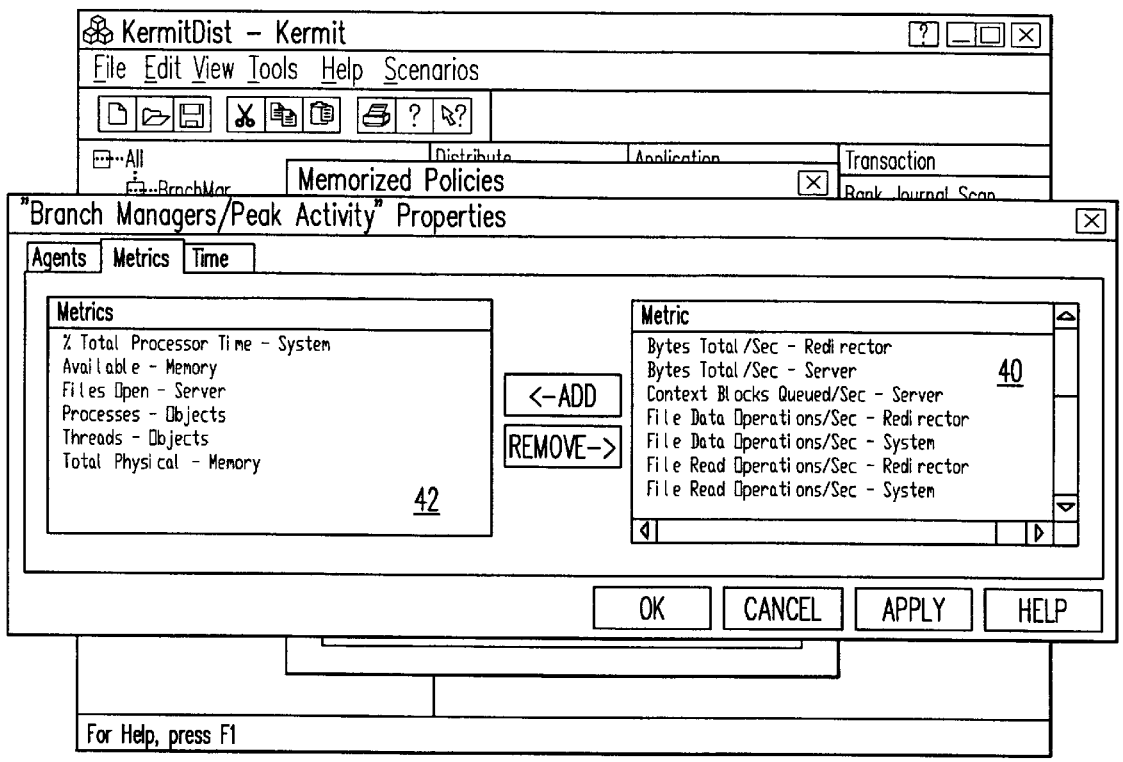

In addition to measuring the latency associated with the performance of tasks, the agent 18 permits other types of network monitoring functions to be carried out. To this end, the user can establish a policy that can be applied to a defined transaction. In essence, a policy comprises a saved definition of the agents which are to monitor a defined transaction, additional metrics that can be measured in addition to the defined latency period, and specific times at which the monitoring operation is to be carried out. FIG. 8 illustrates an example of a dialog box for selecting the characteristic properties of a policy. The specific example illustrated in the figure pertains to various metrics that can be measured during the execution of a program. The right panel 40 in the figure provides a list of measurable parameters for the network system. The user can select these parameters as desired, to be included in the properties of the policy. The selected metrics are illustrated in the left window 42 of the dialog box.

From the foregoing, therefore, it can be seen that the present invention provides an application monitoring system which is not intrusive, and therefore can be utilized in connection with any type of application program that is executed on a computer. Since the monitoring functions are carried out at the site of the client application itself, rather than intermediate the client and a network server, a true measurement is obtained of the actual latencies that occur in the execution of a program. Furthermore, by utilizing a macro language that translates communications between the application program and operating system into terms that are readily understandable by a user, the ability to configure the monitoring system is greatly enhanced.

With reference to FIG. 4, it can be seen that the monitoring system of the present invention is comprised of a number of components. In a practical implementation of the invention, these components can be distributed in a variety of manners. When used on a stand-alone computer, of course, all of the components may reside on a single computer. However, it is also possible to first define the transaction to be monitored with a configuration manager that is running on one computer, and then distribute that transaction, and any associated policy, to agents on other stand-alone computers which do not contain the configuration manager themselves. In a network environment, it is possible to have an agent running on each network node, as illustrated in the embodiment of FIG. 1. However, such an arrangement is not necessary. Rather, the agents can be located at a central location, and from there instruct the central dispatcher, which might also be located at the central location or on the individual nodes, to initiate the monitoring procedures by establishing the watch functions in the memory space of the application programs to be monitored. Thus, as long as the various modules can communicate with each other as necessary, they can be located anywhere within the networked system.

It will be appreciated by those of ordinary skill in the art that the application can be embodied in other specific forms without departing from the spirit or essential characteristics thereof. For example, although the disclosed embodiment of the invention has been described in the context of a computer which employs the Windows operating system, the practical applications of the invention are not limited thereto. Rather, the invention can be employed in any type of system in which it is possible to externally detect specific events that are associated with the execution of an application program. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for monitoring the response times of application programs running on a computer, comprising the steps of:

observing communications between an application program and an operating system program running on the computer;

detecting the times at which predefined communications are exchanged between the application program and the operating system program;

determining the latency associated with an application response in accordance with the difference in detected times; and storing the determined latency.

2. The method of claim 1 wherein said predefined communications are selected by a user from a sequence of communications that are exchanged between the application program and the operating system program.

3. The method of claim 2 wherein said sequence of communications is provided to the user by operating the application program in a normal manner, recording communications that are exchanged during such operation, terminating the recording of communications and displaying the recorded communications upon termination of the recording process.

4. An applications agent for monitoring the response times of application programs running on a computer, comprising:

means for observing communications between an application program and an operating system program running on the computer;

means for detecting the times at which said communications are exchanged between the application program and the operating system program;

means for calculating the latency associated with the difference in detected times; and means for storing the calculated latency.

5. The agent of claim 4 further including a configuration manager for enabling a user to select predefined communications from a sequence of communications that are exchanged between the application program and the operating system program, and wherein said detecting means detects the times at which said predefined communications occur.

6. The agent of claim 5 wherein said configuration manager includes means for recording communications that are exchanged during the operation of the application program in a normal manner, means for terminating the recording of communications, means for displaying the recorded communications upon termination of the recording process, and means for enabling the user to designate selected ones of the displayed communications as said predefined communications.

7. The agent of claim 6 further including means for translating communications exchanged between the application program and the operating system program into high-level language terms for display to the user.

8. The agent of claim 7 wherein said translating means combines plural communications into a single high-level language term.

9. A system for monitoring the response times of application programs being executed on a computer, comprising:

a configuration manager for presenting to a user a sequential listing of detectable events which occur during the execution of an application program, including means for enabling the user to select individual ones of said events to define a transaction to be monitored;

means for examining information exchanged between the application program and an operating system running on the computer, to detect the occurrence of the events selected by the user;

means for recording the times at which detected events occur; and means for calculating and storing the elapsed time between the occurrence of selected events, to thereby provide a metric of application response time.

10. The system of claim 9 wherein said configuration manager includes means for recording events which occur as the user issues commands during the execution of an application, and displaying said recorded events as said sequential listing.

* * * * *